United States Patent Office 2,787,635
Patented Apr. 2, 1957

2,787,635

PROCESS FOR PURIFYING TANNIC ACID

Edward M. Filachione and Fred P. Luvisi, Philadelphia, Pa., assignors to the United States of America as represented by the Secretary of Agriculture No Drawing. Application April 8, 1955,
Serial No. 500,308

3 Claims. (Cl. 260—473.6)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This application is a continuation-in-part of our co-pending application entitled "Purification of Tannins," filed October 13, 1954, Serial Number 462,126.

Tannic acid is produced commercially by aqueous extraction of gallnuts. The material thus obtained, however, has a purity of only 80 to 85% and is not sufficiently pure for many purposes, especially pharmaceutical uses. While tannic acid is readily soluble in water and many organic solvents, such solvents usually also dissolve the impurities ordinarily found in crude tannic acid and, hence, have little or no utility in the purification of tannic acid.

The object of this invention is to provide a practical and economical process for the purification of tannic acid.

We have now discovered that methyl isobutyl ketone, hereinafter abbreviated as MIBK, has the unique and unexpected property of being an excellent solvent for tannic acid while at the same time having very little solvent power for the impurities found in crude tannic acid. It also has the additional advantage that it dissolves very little water and is itself substantially insoluble in water, thus vastly simplifying recovery processes. Dry tannic acid has only limited solubility in MIBK; hence, some water must be present in carrying out the process. The necessary water may be added in any convenient way but we prefer to dissolve the crude tannic acid in water and then extract the aqueous solution with MIBK. In order to facilitate extraction of the tannic acid from the aqueous solution, the latter should contain a relatively high initial concentration of the crude acid. This minimizes the volume of MIBK required for the extraction and also simplifies disposal of the exhausted aqueous raffinate.

The practice of the invention is further illustrated by the following experiment:

Twenty-five grams of crude tannic acid of 84.9% purity was dissolved in 75 g. of water and the resulting solution was shaken successively with five 50 ml. portions of MIBK. The combined extracts were evaporated to dryness whereby 85% of the original tannic acid was recovered as a powder of 93.2% purity. Repetition of the process yielded a product of even higher purity. Continuous counter-current extraction of the crude aqueous solution with MIBK is more efficient and is the preferred procedure for commercial operation of our process.

The process of the invention is especially advantageous when applied to the aqueous tannic acid solution obtainable by extracting gallnuts with water, since the necessity of evaporating the aqueous extract to dryness is thereby eliminated. Thus, the most economical, and therefore the preferred process for producing purified tannic acid consists essentially of extracting the macerated gallnuts with water in a counter-current fashion to obtain a strong aqueous solution; then extracting this solution with MIBK, also in a counter-current fashion, to obtain a strong solution of purified acid in the organic solvent; and finally, evaporating the solvent to recover both the purified tannic acid and the MIBK.

While the process of our invention is highly satisfactory for the purification of tannic acid, it is of no value for the purification of the tannins of canaigre, quebracho, wattle, myrobalans, divi-divi, chestnut, mangrove, valonia or cutch, since these tannins have very limited solubility in MIBK. It can be used with gambier tannins but is relatively inefficient because of poor recovery of tannins. The only known tannin for which the process has practical utility is tannic acid.

Sometimes, particularly when the purified tannic acid is to be used immediately as an aqueous solution, in recovering the acid from the MIBK solution it is advantageous to add sufficient water to leave a concentrated aqueous solution of tannic acid after distillation of the MIBK. By this procedure the complete recovery of the MIBK is facilitated and the mechanical handling of the product is facilitated. Also, the danger of heat damage to the product during distillation of the MIBK is minimized.

We claim:

1. The process for producing purified tannic acid comprising contacting an aqueous solution of the acid with methyl isobutyl ketone, whereby the tannic acid is dissolved in the ketone, and recovering the tannic acid from the resulting ketone solution.

2. The process for producing purified tannic acid from gallnuts comprising macerating the gallnuts, contacting the macerated material with water, thus to dissolve the crude tannic acid, contacting the thus obtained aqueous tannic acid solution with methyl isobutyl ketone, thus to dissolve the acid in the ketone, and recovering the acid from the ketone solution.

3. The process of claim 2 wherein the step of recovering the tannic acid from the methyl isobutyl ketone solution comprises adding an amount of water more than sufficient to form the ketone-water azeotrope and then distilling the said azeotrope, thus recovering the tannic acid as a distillation residue consisting essentially of an aqueous solution of tannic acid.

References Cited in the file of this patent

UNITED STATES PATENTS 2,694,725   Filachione et al. -------- Nov. 16, 1954